(12) United States Patent
Bytow et al.

(10) Patent No.: US 9,623,531 B2
(45) Date of Patent: Apr. 18, 2017

(54) UNLOADING PROCESSED SHEET METAL WORKPIECES FROM A SUPPORT

(71) Applicant: Trumpf Corporation, Yokohama (JP)

(72) Inventors: Peter Bytow, Simmozheim (DE); Katsuya Enomoto, Yokohama (JP)

(73) Assignee: Trumpf Corporation, Yokohama (JP)

( * ) Notice: Subject to any disclaimer, the term of this patent is extended or adjusted under 35 U.S.C. 154(b) by 389 days.

(21) Appl. No.: 13/867,218

(22) Filed: Apr. 22, 2013

(65) Prior Publication Data

US 2013/0236277 A1    Sep. 12, 2013

Related U.S. Application Data

(63) Continuation of application No. PCT/EP2011/067779, filed on Oct. 12, 2011.

(30) Foreign Application Priority Data

Oct. 22, 2010  (EP) .................................... 10188498

(51) Int. Cl.
*B21D 43/00*  (2006.01)
*B23Q 7/00*   (2006.01)
(Continued)

(52) U.S. Cl.
CPC .............. *B23Q 7/00* (2013.01); *B21D 43/00* (2013.01); *B21D 43/11* (2013.01); *B23Q 7/06* (2013.01)

(58) Field of Classification Search
CPC ...... B21D 43/00; B21D 43/02; B21D 43/026; B21D 43/04; B21D 43/06; B21D 43/10;
(Continued)

(56) References Cited

U.S. PATENT DOCUMENTS 4,941,793 A  *  7/1990  Shiraishi et al. .............. 198/458
6,179,549 B1 *  1/2001  Hayakawa ............. B21D 28/12
                                                 414/222.11
(Continued)

FOREIGN PATENT DOCUMENTS

EP    0331661 A1    9/1989
EP    1935526 A1    6/2008
(Continued)

OTHER PUBLICATIONS

Notification of Transmittal of Translation of the International Preliminary Report on Patentability for corresponding PCT Application No. PCT/EP2001/067779, mailed May 2, 2013, 7 pages.
(Continued)

*Primary Examiner* — Michael McCullough
*Assistant Examiner* — Brendan Tighe
(74) *Attorney, Agent, or Firm* — Fish & Richardson P.C.

(57) ABSTRACT

Workpieces are unloaded from a workpiece support of a sheet metal workpiece processing apparatus by positioning a blank sheet metal workpiece over a processed workpiece supported on a workpiece support, with the blank workpiece releasably held by a workpiece loader, activating a workpiece fixing device to engage an edge of the processed workpiece, and performing a relative sweeping movement between the workpiece fixing device and the workpiece support whereby the engaged processed workpiece is prevented from remaining on the workpiece support and is thereby unloaded. The workpiece fixing device is moved relative to the processed workpiece while the blank sheet metal workpiece is positioned over the processed workpiece.

14 Claims, 9 Drawing Sheets

(51) Int. Cl.
*B21D 43/11* (2006.01)
*B23Q 7/06* (2006.01)

(58) Field of Classification Search
CPC ...... B21D 43/105; B21D 43/11; B21D 43/18;
B21D 43/20; B21D 43/22; B21D 43/24;
B23Q 7/005; B23Q 7/04; B23Q 7/043;
B23Q 7/046; B23Q 7/047; B23Q 7/048
USPC .......... 271/3.08, 3.24, 4.1, 14, 84, 226, 228,
271/241, 252, 268, 269; 414/20, 222.01,
414/222.03, 222.08, 590, 749.1, 795.4
See application file for complete search history.

(56) References Cited

U.S. PATENT DOCUMENTS

| 2002/0192058 | A1* | 12/2002 | Harsch et al. ........... 414/225.01 |
| 2003/0147729 | A1  | 8/2003  | Leibinger et al. |
| 2007/0077135 | A1* | 4/2007  | Harsch et al. ........... 414/222.01 |
| 2008/0182737 | A1  | 7/2008  | Jost et al. |
| 2011/0318144 | A1* | 12/2011 | Kobayashi et al. ..... 414/222.01 |

FOREIGN PATENT DOCUMENTS

| JP | 5817429 U    | 5/1983 |
| JP | 542254 U     | 6/1993 |
| JP | 2001225128 A | 8/2001 |
| JP | 2008126314 A | 6/2008 |

OTHER PUBLICATIONS

Brochure "Product Information for TruPunch 2020", TRUMPF Werkzeugmaschinen GmbH + Co. KG, Oct. 2006, 34 pages.

* cited by examiner

UNLOADING PROCESSED SHEET METAL WORKPIECES FROM A SUPPORT

CROSS REFERENCE TO RELATED APPLICATIONS

This application is a continuation of and claims priority under 35 U.S.C. §120 to PCT Application No. PCT/EP2011/067779 filed Oct. 12, 2011, which claimed priority to European Application No. 10 188 498.9, filed Oct. 22, 2010. The contents of both of these priority applications are hereby incorporated by reference in their entirety.

TECHNICAL FIELD

The invention relates to unloading processed workpieces, in particular metal sheets, from a support after processing.

BACKGROUND

US 2003/0147729A1 discloses a mechanical arrangement having a machine tool for processing metal sheets and having a mechanical loading and unloading device for the machine tool. The loading and unloading device has a machine frame on which a loading unit in the form of a suction member frame and a gripping member of an unloading unit are driven in a motorized manner and moved in a numerically controlled manner. Using the suction member frame, metal sheets to be processed are supplied to a workpiece support of the machine tool. The metal sheets to be processed are picked up by means of suction members of the suction member frame from a pallet which is arranged below the workpiece support and deposited on the workpiece support after a subsequent lifting movement of the suction member frame and the metal sheet which is held thereon. After the workpiece support has been loaded with a metal sheet to be processed, the suction member frame is again lowered to a level below the workpiece support. After completion of the metal sheet processing operation, the gripping member moves in a horizontal direction from a parking position into a sweeping position. In the sweeping position, the gripping member grips an edge of the processed metal sheet which itself rests on the workpiece support of the machine tool. With the gripping member remaining in the sweeping position, the workpiece support is pulled out below the processed metal sheet parallel with the support plane which is formed on the workpiece support. The processed metal sheet, which is fixed to the gripping member and which consequently cannot follow the movement of the workpiece support, is swept from the workpiece support and deposited on a pallet arranged below the workpiece support. The suction member frame and the gripping member are operated in a mutually co-ordinated manner, but are separated from each other in terms of driving.

SUMMARY

One aspect of the invention features a mechanical arrangement or machine system for processing a workpiece such as a metal sheet. The arrangement or machine system includes a workpiece support, a loading device and an unloading device. The loading device has a workpiece holding member which is movable in a driven manner relative to the workpiece support and by means of which a workpiece can be supplied to the workpiece support by the workpiece holding member together with a workpiece secured thereto being able to be moved with a loading movement relative to the workpiece support. The unloading device is in the form of a sweeping device which has a workpiece fixing device and by means of which a workpiece can be swept from the workpiece support by the workpiece fixing device being able to be moved with a positioning movement into a sweeping position in which a workpiece to be swept off can be secured to the workpiece fixing device and by the workpiece secured to the workpiece fixing device on the one hand and the workpiece support on the other hand being able to be moved relative to each other with the workpiece being swept from the workpiece support with a sweeping movement.

Another aspect of the invention features a method for unloading workpieces from a workpiece support of a mechanical arrangement for processing workpieces, in particular metal sheets, which has a loading device having a workpiece holding member which is movable in a driven manner relative to the workpiece support and an unloading device in the form of a sweeping device having a workpiece fixing device. A workpiece is supplied to the workpiece support by means of the loading device by the workpiece holding member of the loading device together with a workpiece secured thereto being moved with a loading movement relative to the workpiece support. The workpiece is swept from the workpiece support by means of the sweeping device by the workpiece fixing device of the sweeping device being moved with a positioning movement into a sweeping position in which a workpiece to be swept off is secured to the workpiece fixing device and by the workpiece secured to the workpiece fixing device on the one hand and the workpiece support on the other hand being moved relative to each other with a sweeping movement with the workpiece being swept from the workpiece support.

The workpiece fixing device of the sweeping device, during the positioning movement thereof into the sweeping position, is at least partially connected to the workpiece holding member of the loading device. Owing to the coupling in terms of movement of the workpiece fixing device and the workpiece holding member, the drive of the workpiece holding member can at the same time be used for the positioning movement of the workpiece fixing device. The drive of the workpiece fixing device and the workpiece holding member can consequently be produced with little structural complexity. Owing to the dual use of one and the same drive, components can be saved in comparison with the use of two separate drives. The saving in terms of components again leads to a compact structure of the overall arrangement.

In a preferred embodiment of the invention, the movement connection between the workpiece fixing device of the sweeping device and the workpiece holding member of the loading device is produced by means of a mechanical connection for the sake of simplicity.

In some embodiments, to this end, the workpiece fixing device is fitted to a carrier structure of the workpiece holding member. The workpiece holding member has holding elements of conventional construction type by means of which workpieces to be processed are secured to the workpiece holding member during the loading operation. For example, suction members or retention magnets can be used as holding elements.

In some embodiments, there is provision for the workpiece fixing device and/or the workpiece holding member to be able to be lowered below the workpiece support. The workpiece fixing device and/or the workpiece holding member can accordingly be moved into positions in which they do not impede the operations at the upper side of the workpiece support, in particular the workpiece processing operation which is carried out at that location, and in which they are at the same time protected from process-related influences, such as contamination. Furthermore, the workpiece fixing device and the workpiece holding member can be passed over by the workpiece support when it has corresponding movability. This results in a space-saving construction of the mechanical arrangement.

The sweeping movement for unloading workpieces from the workpiece support can be produced in different manners. In some cases, the workpiece support is moved relative to the workpiece which is secured to the workpiece holding device of the unloading device, with the workpiece being swept off. In order to produce the sweeping movement, use is consequently made of the movability of the workpiece support which is already present in many cases. The workpiece fixing device can remain in the sweeping position during the sweeping operation.

In some embodiments, the workpiece fixing device of the unloading device has a fixing member which is provided specifically for securing the workpiece to be swept off.

In some cases, the workpiece fixing device which is moved into the sweeping position can be activated or deactivated. In the activated state, the workpiece fixing device secures the workpiece to be swept off. The fact that the workpiece fixing device can be selectively activated or deactivated has been found to be advantageous in particular in view of the coupling in terms of movement of the workpiece fixing device to the workpiece holding member of the loading device. It is in particular possible to deactivate the workpiece fixing device during the positioning movement into the sweeping position carried out together with the workpiece holding member and to produce the activated state of the workpiece fixing device only when it has reached the sweeping position and consequently has to be in the position to secure workpieces which are to be swept from the workpiece support. Preferably, the spatial requirement of the unit comprising the workpiece fixing device and the workpiece holding member when the workpiece fixing device is deactivated is smaller than when the workpiece fixing device is activated.

If the workpiece fixing device has a fixing member, it is recommended, in order to activate or deactivate the workpiece fixing device, to move the fixing member with an activation movement into an operational position or with a deactivation movement into a non-operational position. The non-operational position of the fixing member is in particular selected in such a manner that the fixing member does not impede the positioning movement of the workpiece fixing device into the sweeping position.

In the interests of the simplest kinematic relationships possible, in another preferred embodiment for moving the fixing member of the workpiece fixing device into the operational position and/or into the non-operational position, an at least partially linear activation movement is preferred.

In particular linear activation and/or deactivation movements may be produced by means of a piston/cylinder unit. In order to operate the piston/cylinder unit, it is possible to use media, in particular compressed air or pressurized fluids, which are in any case required in mechanical arrangements of this type.

Some embodiments are characterized by a structurally particularly simple construction, wherein the fixing member of the workpiece fixing device is in the form of a stop. A component specifically intended for fixing workpieces to be swept off may be used as the stop. Alternatively, however, it is also possible to provide devices used in other manners as the stop for workpieces to be swept off. In particular components of the workpiece holding member are conceivable as the stop, such as, for example, base members of suction members, which otherwise serve to secure workpieces to the workpiece holding member.

In the interests of functionally reliable operation of the mechanical arrangement and undisrupted implementation of the method, in some examples workpieces which are swept from the workpiece support are guided by means of the workpiece fixing device. The workpiece guiding ensures that the workpieces swept from the workpiece support move along a defined movement path. Workpieces can thereby in particular be prevented from damaging components or devices in their vicinity during sweeping from the workpiece support.

The invention is explained in greater detail below with reference to exemplary schematic illustrations.

DETAILED DESCRIPTION

Figure 1:
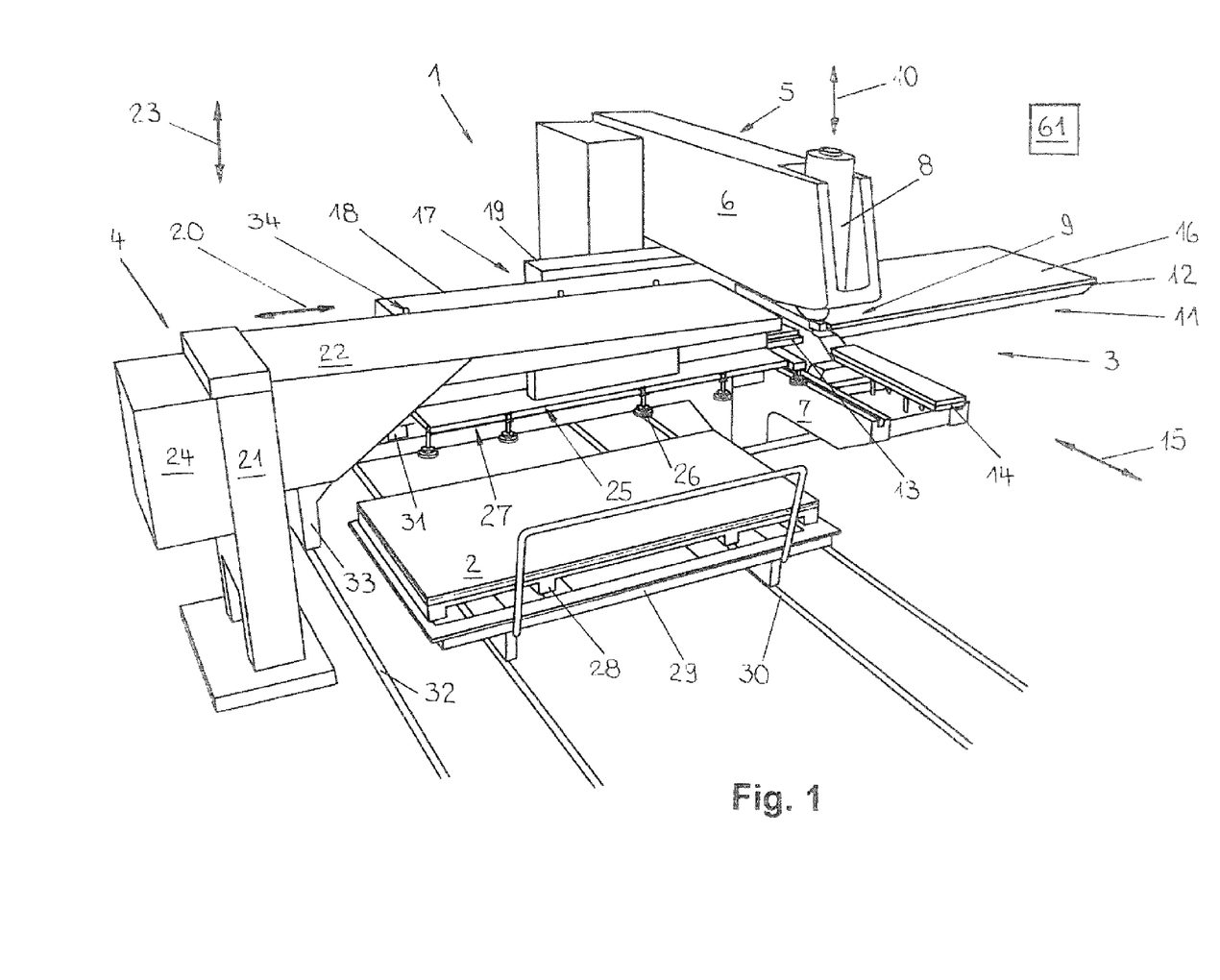
FIG. 1 is a perspective view of a mechanical arrangement for processing metal sheets having a punching machine and an automation unit.

According to FIG. 1, a mechanical arrangement 1 for punching processing of workpieces in the form of (blank) metal sheets 2 comprises a punching machine 3 and an automation unit 4.

The punching machine 3 has a C-shaped machine frame 5 having an upper frame member 6 and a lower frame member 7. At the free end of the upper frame member 6 is a punch drive 8 of a punching station 9 of the punching machine 3. At the punching station 9, a punching stamp which is guided on the upper frame member 6 is moved in conventional manner relative to a punching die which is provided on the lower frame member 7 in a stroke direction 10.

A workpiece support 11 is supported on the lower frame member 7 and comprises two movable support portions 12, 13 which are arranged on either side of a stationary support portion 14. The movable support portions 12, 13 can be moved by means of a drive (not illustrated) in a movement direction (double-headed arrow) 15 along the lower frame member 7. Both the movable support portions 12, 13 and the stationary support portion 14 of the workpiece support 11 are provided with conventional support brushes 16 at the upper side thereof.

In the jaw space of the machine frame 5 of the punching machine 3, a coordinate guide 17 of conventional structural form is accommodated. This conventionally comprises a transverse rail 18 and a transverse guide 19 which is provided therefor. The transverse rail 18 is movably guided on the transverse guide 19 in a movement direction (double-headed arrow) 20. The movement direction 20 of the transverse rail 18 extends perpendicularly relative to the movement direction 15 of the movable support portions 12, 13 of the workpiece support 11. In conventional manner, clamping claws for fixing the workpieces which are to be processed (not shown for reasons of simplicity) are fitted to the transverse rail 18. Furthermore, the transverse rail 18 of the punching machine 3, which is illustrated by way of example, is also used as a linear magazine for punching tools. Together with the transverse guide 19 and the movable support portions 12, 13 of the workpiece support 11 that are connected thereto, the transverse rail 18 can move in the movement direction 15 of the movable support portions 12, 13. Owing to the movement possibilities of the transverse rail 18, workpieces which are secured to the transverse rail 18 by means of the clamping claws can be moved with respect to the punching station 9 in a horizontal plane which is defined by means of the movement directions 15, 20. In conventional manner, the movement possibilities of the transverse rail 18 are also used for tool changing at the punching station 9.

The automation unit 4 is located in the direct vicinity of the punching machine 3. It forms a separate unit without any mechanical connection to the machine frame 5 of the punching machine 3.

The automation unit 4 has a guiding column 21 and a cantilever arm 22 which protrudes therefrom in a horizontal direction. The cantilever arm 22 is movably guided on the guiding column 21 in a vertical movement direction 23 (double-headed arrow). During movements in the movement direction 23, the cantilever arm 22 is driven by a motorized drive 24, which in turn is accommodated in a drive housing mounted on the guiding column 21.

A suction member frame 25 is suspended from the lower side of the cantilever arm 22. It is provided with a plurality of holding elements which are constructed as suction members 26 in the example shown. The cantilever arm 22, the suction member frame 25 and the suction members 26 form a workpiece holding member 27. The cantilever arm 22 assumes the function of a carrier structure of the workpiece holding member 27.

The workpiece holding member 27 having the cantilever arm 22, the suction member frame 25 and the suction members 26 can be raised in the movement direction 23 above the workpiece support 11 of the punching machine 3 and be lowered below the workpiece support 11. This movement possibility of the workpiece holding member 27 is used to load the workpiece support 11 with (blank) metal sheets 2. In this regard, the automation unit 4, which is provided with the workpiece holding member 27, forms a loading device of the mechanical arrangement 1.

FIG. 1 shows the workpiece holding member 27 in the upper end position on the guiding column 21. Below the suction member frame 25 and the suction members 26, in the remaining free space at that location, a blank metal sheet pallet 28 is arranged with blank metal sheets 2 to be processed. The blank metal sheet pallet 28 is supported on a pallet carriage 29. This can be moved manually on guide rails 30.

Substantially concealed in FIG. 1 is a completed part pallet 31, which can move in the same direction as the pallet carriage 29. To this end, the completed part pallet 31 is supported on guide rails 32 by means of an undercarriage 33. The movement unit, which comprises the undercarriage 33 and the completed part pallet 31, engages over the pallet carriage 29 with the blank metal sheet pallet 28, which is supported thereon in the manner of a portal. Consequently, the completed part pallet 31 can move along the guide rails 32 over the blank metal sheet pallet 28. The height of the undercarriage 33 is selected in such a manner that the completed part pallet 31 is located with the upper side thereof below the workpiece support 11 of the punching machine 3. The completed part pallet 31 can therefore move below the workpiece support 11 in the direction of the guide rails 32, which extend in the movement direction 15, or can be passed over by the workpiece support 11 in the mentioned direction.

Also concealed to a great extent in FIG. 1 are workpiece fixing devices 34 which are secured to the rear side of the cantilever arm 22 remote from the observer of FIG. 1. In the example shown, a total of three workpiece fixing devices 34 are arranged along the cantilever arm 22. Together, the workpiece fixing devices 34 serve to sweep processed workpieces from the workpiece support 11 of the punching machine 3 for unloading. In this regard, the automation unit 4, which is provided with the workpiece fixing devices 34, forms an unloading device of the mechanical arrangement 1 constructed as a sweeping device.

Figure 2:
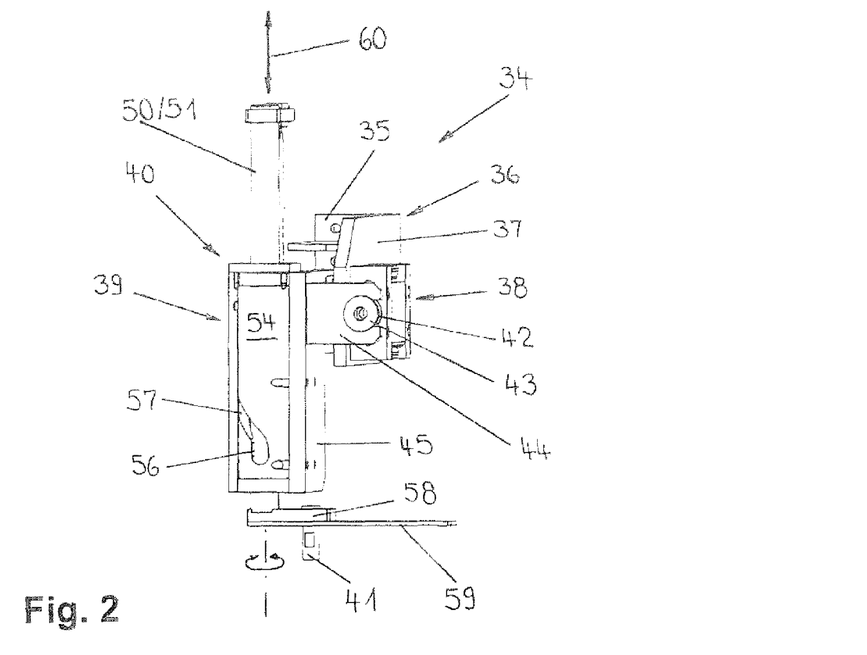
FIGS. 2 and 3 are various views of a workpiece fixing device of the automation unit according to FIG. 1.
Figure 3:
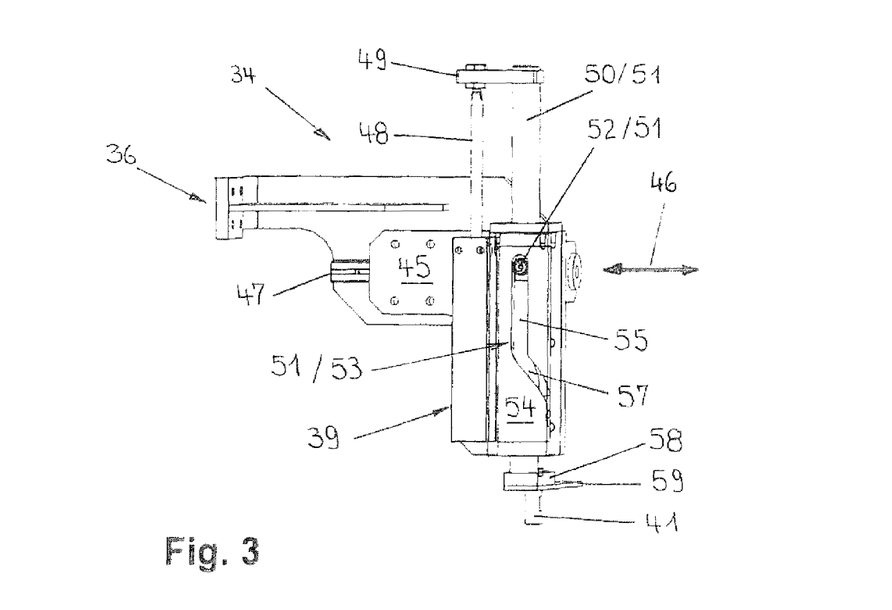

One of the three structurally identical workpiece fixing devices 34 is illustrated in detail in FIGS. 2 and 3.

On a transverse member 35 of a securing angled member 36, the workpiece fixing devices 34 are screwed to the rear longitudinal side of the cantilever arm 22 in FIG. 1 and consequently connected to the cantilever arm and the entire workpiece holding member 27 mechanically and also in terms of movement. A longitudinal member 37 of the securing angled member 36 carries a first drive unit 38. Together with a second drive unit 39, the first drive unit 38 forms an activation/deactivation drive 40 for a fixing member 41 of the workpiece fixing device 34, constructed as a stop. Both the first drive unit 38 and the second drive unit 39 are pneumatic piston/cylinder units.

A retention element 43 which is provided with a peripheral groove 42 is located on the piston rod of the first drive unit 38. In the peripheral groove 42 of the retention element 43, a plate 44 engages with a fork-like end. At the opposing end, the plate 44 is welded to a carrying and guiding plate 45 for the second drive unit 39.

By the first drive unit 38 being actuated, the second drive unit 39 can be moved back and forth via the plate 44 and the carrying and guiding plate 45 in the direction of a double-headed arrow 46. This movement direction of the second drive unit 39 extends coaxially with the movement direction 15 of the movable support portions 12, 13 of the workpiece support 11. During the movement in the direction of the double-headed arrow 46, the second drive unit 39 is guided at the inner side of the securing angled member 36 remote from the first drive unit 38. A guide rail 47 at the inner side of the longitudinal member 37 of the securing angle 36 can be seen in FIG. 3.

A piston rod 48 of the second drive unit 39 engages via a yoke 49 on a guiding rod 50. The guiding rod 50 is supported on the yoke 49 so as to be rotationally movable about the longitudinal axis thereof. It is a component of a vertical guide 51 for the fixing member 41.

The vertical guide 51 is a slotted guiding member having a guide pin 52 fitted to the guide rod 50 and having a guide slot 53 integrated in the axially parallel wall of a guide pipe 54 fitted to the carrying and guiding plate 45 for the guide rod 50. The guide slot 53 comprises end portions 55, 56 which extend linearly in a vertical direction and which are offset relative to each other in the peripheral direction of the guide pipe 54 and a transition portion 57, which connects the linear end portions 55, 56 to each other and which is inclined with respect to the vertical.

At the end located in the direction towards the fixing member 41, an arm 58 is fitted to the guide rod 50. The arm 58 itself carries the fixing member 41, which protrudes downwards. This member is arranged eccentrically relative to the longitudinal axis of the guide rod 50. Overall, there is produced at the lower end of the guiding rod 50 a crank-like arrangement with the fixing member 41 as a crank pin. A guiding plate 59 projects beyond the arm 58 in the longitudinal direction thereof and is fitted to the lower side of the arm 58.

By the second drive unit 39 being actuated, the guide rod 50 can be raised and lowered together with the fixing member 41, which is fitted thereto in a vertical direction (double-headed arrow) 60. Associated with the vertical movement is a rotational movement of the guide rod 50, which is brought about by the vertical guide 51 about the longitudinal axis of the guide rod 50. A pivot movement of the fixing member 41 and the guiding plate 59 about the longitudinal axis of the guide rod 50 results from the rotation movement of the guide rod 50.

In FIGS. 2 and 3, the piston rod of the first drive unit 38 of the workpiece fixing device 34 is retracted in the associated piston. The second drive unit 39 is consequently moved in the direction of the double-headed arrow 46 into the end position thereof, which is located in the direction towards the cantilever arm 22 in the assembly position. At the same time, the guiding rod 50 of the second drive unit 39 assumes the upper end position thereof in the direction of the double-headed arrow 60. Linked with this is an orientation of the arm 58 which is mounted on the guiding rod 50 in a rotationally secure manner and the guiding plate 59 parallel with the longitudinal direction of the cantilever arm 22. On the whole, the workpiece fixing device 34 is deactivated in FIGS. 2 and 3. The fixing member 41 is located in the non-operational position.

In order to activate the workpiece fixing device 34 or to move the fixing member 41 into the operational position, the first drive unit 38 and the second drive unit 39 are to be actuated starting from the state shown in FIGS. 2 and 3. Owing to the actuation of the first drive unit 38, the second drive unit 39 moves in the direction of the double-headed arrow 46 into a position in which it has maximum spacing from the cantilever arm 22 in the direction of the double-headed arrow 46. The actuation of the second drive unit 39 results in the guide rod 50 moving in the direction of the double-headed arrow 60 into the lower end position thereof. A rotation movement of the guide rod 50 brought about by the vertical guide 51 is associated with this linear movement of the guide rod 50. Owing to the rotation movement of the guide rod 50, the fixing member 41 pivots about the longitudinal axis of the guide rod 50 into a position in which the arm 58 extends perpendicularly to the longitudinal side of the cantilever arm 22 and in which the fixing member 41 is consequently moved as close as possible to the cantilever arm 22. At the end of the partially linear, partially rotational activation movement, the fixing member 41 is in the operational position. The same applies to the guiding plate 59 which, owing to the movement of the guide rod 50, also carries out a linear movement in the direction of the double-headed arrow 60 and a pivot movement about the longitudinal axis of the guide rod 50.

In the same manner as all the remaining significant components of the mechanical arrangement 1, the workpiece fixing devices 34 are also controlled by a numerical machine control unit 61 shown in FIG. 1.

An operating cycle in the mechanical arrangement 1 begins with the operating state illustrated in FIG. 1. The workpiece holding member 27 with the cantilever arm 22, the suction member frame 25 and the suction members 26 is arranged over the blank metal sheet pallet 28. In the movement direction 23, the workpiece holding member 27 is in the upper end position, in which the suction members 26 protruding downwards on the suction member frame 25 are located higher than the upper side of the movable support portions 12, 13 of the workpiece support 11.

The workpiece fixing devices 34 at the rear side of the cantilever arm 22 are in the deactivated state of FIGS. 2 and 3. The second drive unit 39 of each of the workpiece fixing devices 34 is moved as close as possible to the cantilever arm 22 in the direction of the double-headed arrow 46. The guiding rod 50 of the second drive units 39 is located in the upper end position thereof and the fixing members 41 of the workpiece fixing devices 34 accordingly assume their non-operational position. The arm 58 and the guiding plate 59 of the workpiece fixing devices 34 extend parallel with the longitudinal side of the cantilever arm 22 and consequently also parallel with the front longitudinal edge of the movable support portion 13 of the workpiece support 11 facing the cantilever arm 22. Overall, the projection of the workpiece fixing devices 34 is minimized in the direction towards the movable support portion 13.

Below the movable support portion 13, the completed part pallet 31 is moved into the rear end position thereof located in the direction towards the transverse rail 18 of the punching machine 3. The movable support portion 13 of the workpiece support 11 also takes up the rear end position thereof in the movement direction 15 in FIG. 1.

Figure 4:
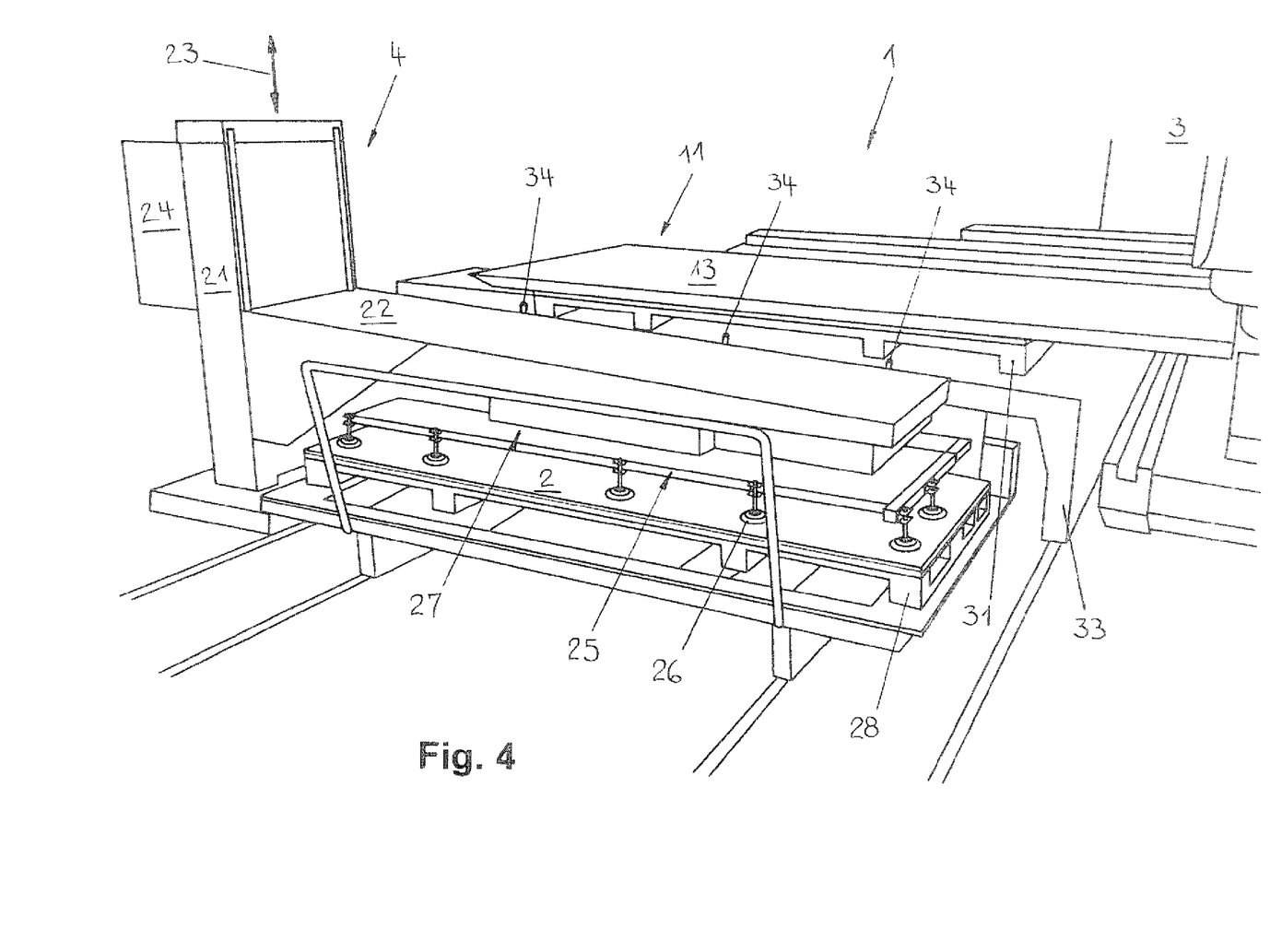
FIGS. 4-11 sequentially illustrate a processing cycle in the mechanical arrangement according to FIG. 1.

Starting from the relationships shown in FIG. 1, the workpiece holding member 27 is lowered by means of the motorized drive 24 in the movement direction 23 until the suction members 26 on the suction member frame 25 touch the (blank) metal sheet 2, which is placed on the blank metal sheet pallet 28 in the uppermost position. The operating state shown in FIG. 4 is consequently produced.

The cantilever arm 22 and with it the entire workpiece holding member 27 is now arranged below the workpiece support 11. During the lowering movement, inter alia the cantilever arm 22 with the workpiece fixing devices 34 fitted thereto must pass the workpiece support 11, more specifically the movable support portion 13, in the vertical direction. Regardless of this, the automation unit 4 can be constructed close to the front end of the movable support portion 13 that is arranged in the rear end position, which front end extends parallel with the longitudinal direction of the cantilever arm 22, since the workpiece fixing devices 34 are in the deactivated state during the lowering movement of the cantilever arm 22. Their protrusion with respect to the rear side of the cantilever arm 22 is consequently minimized.

Figure 5:
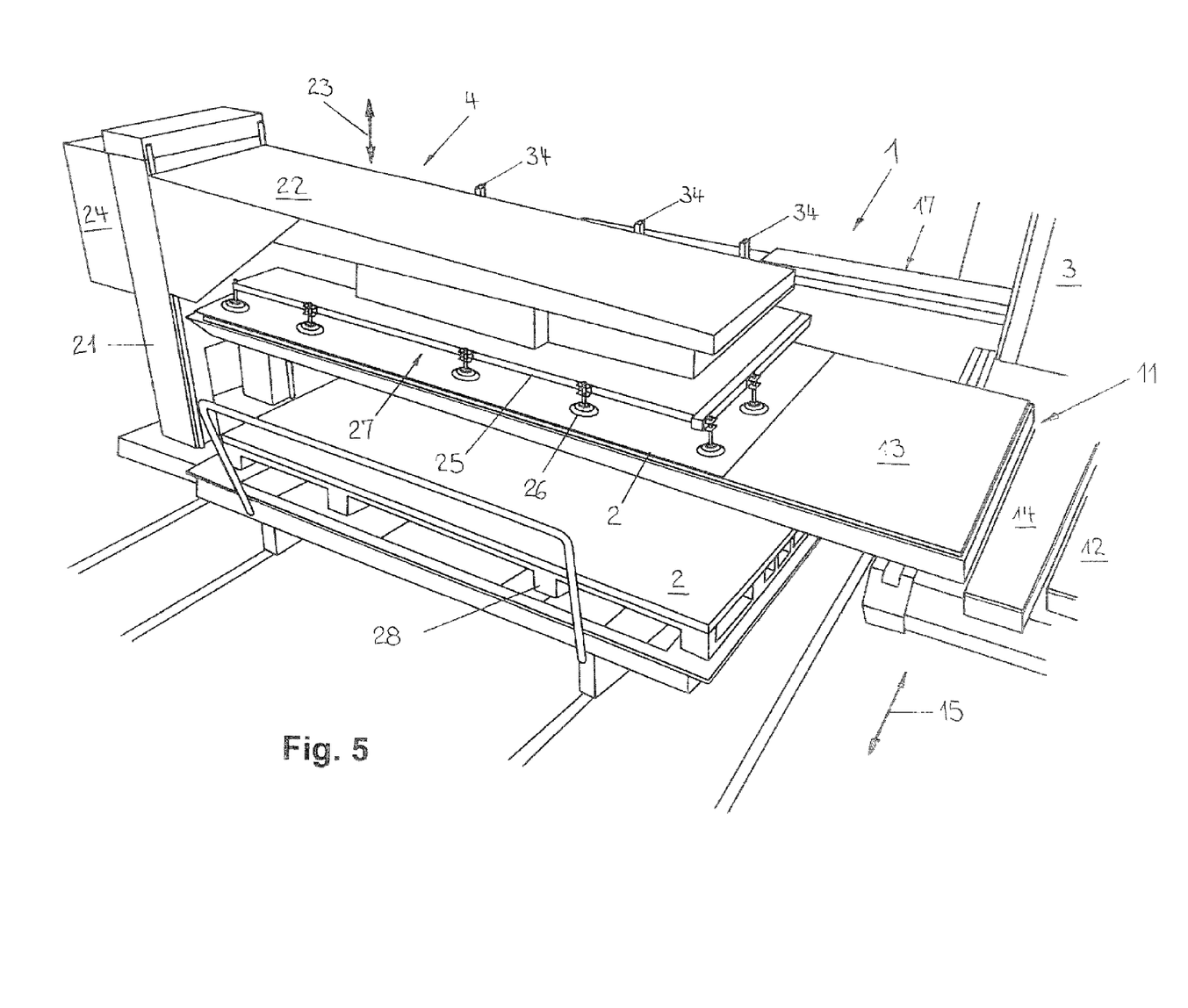

After being placed on the uppermost (blank) metal sheet 2 of the blank metal sheet pallet 28, the suction members 26 are activated by applying a vacuum. Subsequently, the workpiece holding member 27 with the (blank) metal sheet 2 fixed to the suction members 26 is raised by the motorized drive 24 with a loading movement in the direction towards the upper end position thereof. In the reached position, the (blank) metal sheet 2 held by the workpiece holding member 27 (cantilever arm 22, suction members frame 25, suction members 26) is also located above the workpiece support 11. Consequently, the movable support portion 13 of the workpiece support 11 may move in the movement direction 15 from the rear into the front end position thereof below the (blank) metal sheet 2 held on the suction members 26. The resultant relationships are illustrated in FIG. 5.

The suction members 26 are now deactivated and the (blank) metal sheet 2 previously held on the suction members 26 is transferred to the workpiece support 11 or the movable support portion 13 and taken up at that location by the clamping claws of the coordinate guide 17. After the (blank) metal sheet 2 has been taken up, the workpiece support 11 first moves in the movement direction 15 from the front end position as shown in FIG. 5 into the rear end position thereof. When the workpiece support 11 has reached the rear end position thereof, the workpiece holding member 27, with the workpiece fixing devices 34 still deactivated, is lowered again below the level of the workpiece support 11 into the position shown in FIG. 4.

The (blank) metal sheet 2 is then processed. The (blank) metal sheet 2 is moved, by means of the coordinate guide 17 and with the workpiece support 11 being moved, relative to the punching station 9 of the punching machine 3. From the (blank) metal sheet 2, completed parts are cut out until they are connected to the remaining metal sheet only by means of so-called micro-joints. Owing to the micro-joints, the completed parts remain in the composite metal sheet. During the metal sheet processing operation, the workpiece support 11 with the movable support portion 13 moves over the tool holding member 27 which has previously been lowered into the lower end position.

Figure 6:
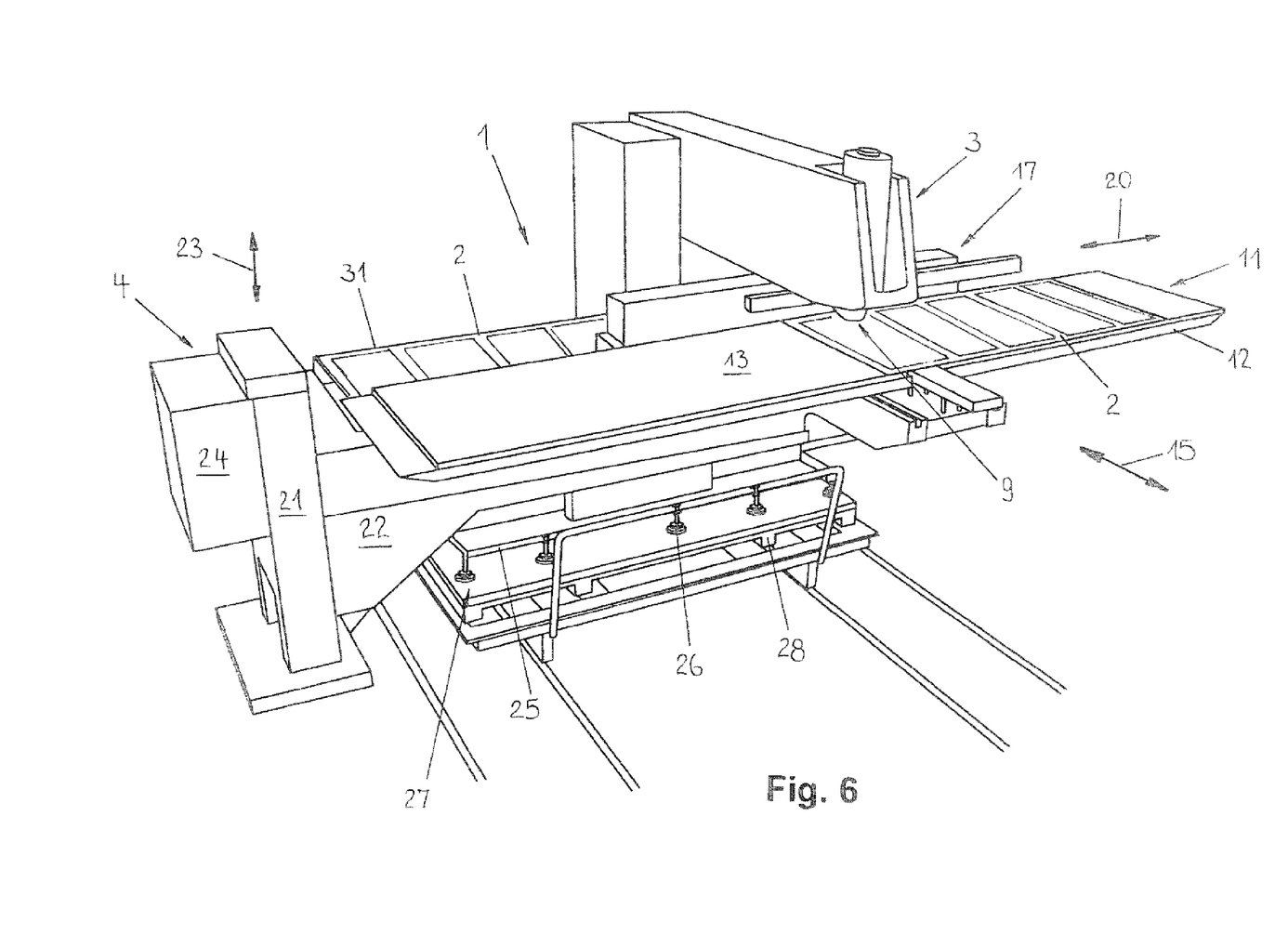

As illustrated in FIG. 6, at the end of the processing operation, the (processed) metal sheet 2 is supported to a great extent on the movable support portion 12 of the workpiece support 11. At this time, the movable support portions 12, 13 of the workpiece support 11 are located close to the front end position thereof. In FIG. 6, the movable support portion 13 consequently allows the completed part pallet 31 to be seen on which already (processed) metal sheets 2 are placed.

Figure 7:
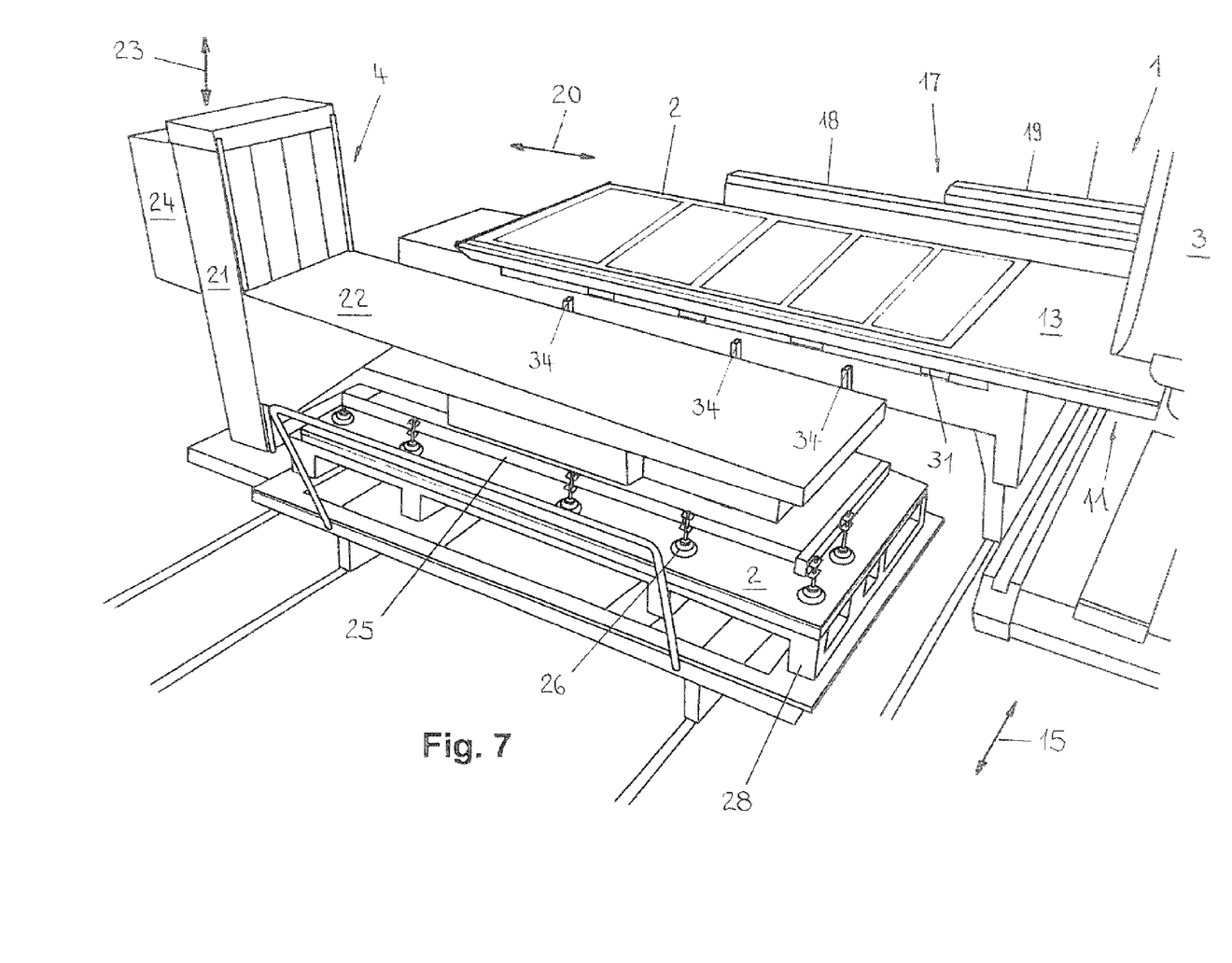

After the processing operation has ended, the transverse rail 18 moves in the movement direction 20 into the end position thereof on the movable support portion 13. The transverse rail 18 carries the (processed) metal sheet 2 which is held thereon by means of the clamping claws. At the same time, the workpiece support 11 with the movable support portion 13 moves into the rear end position in the movement direction 15. The workpiece holding member 27 is lowered as before. The suction members 26 of the workpiece holding member 27, during the previous sheet metal processing operation, have taken up another (blank) metal sheet 2 from the blank metal sheet pallet 28. The workpiece fixing devices 34 at the rear side of the extension arm 22 of the workpiece retention member 27 are still in the deactivated state. The relevant operating state of the mechanical arrangement 1 is illustrated in FIG. 7.

Figure 8:
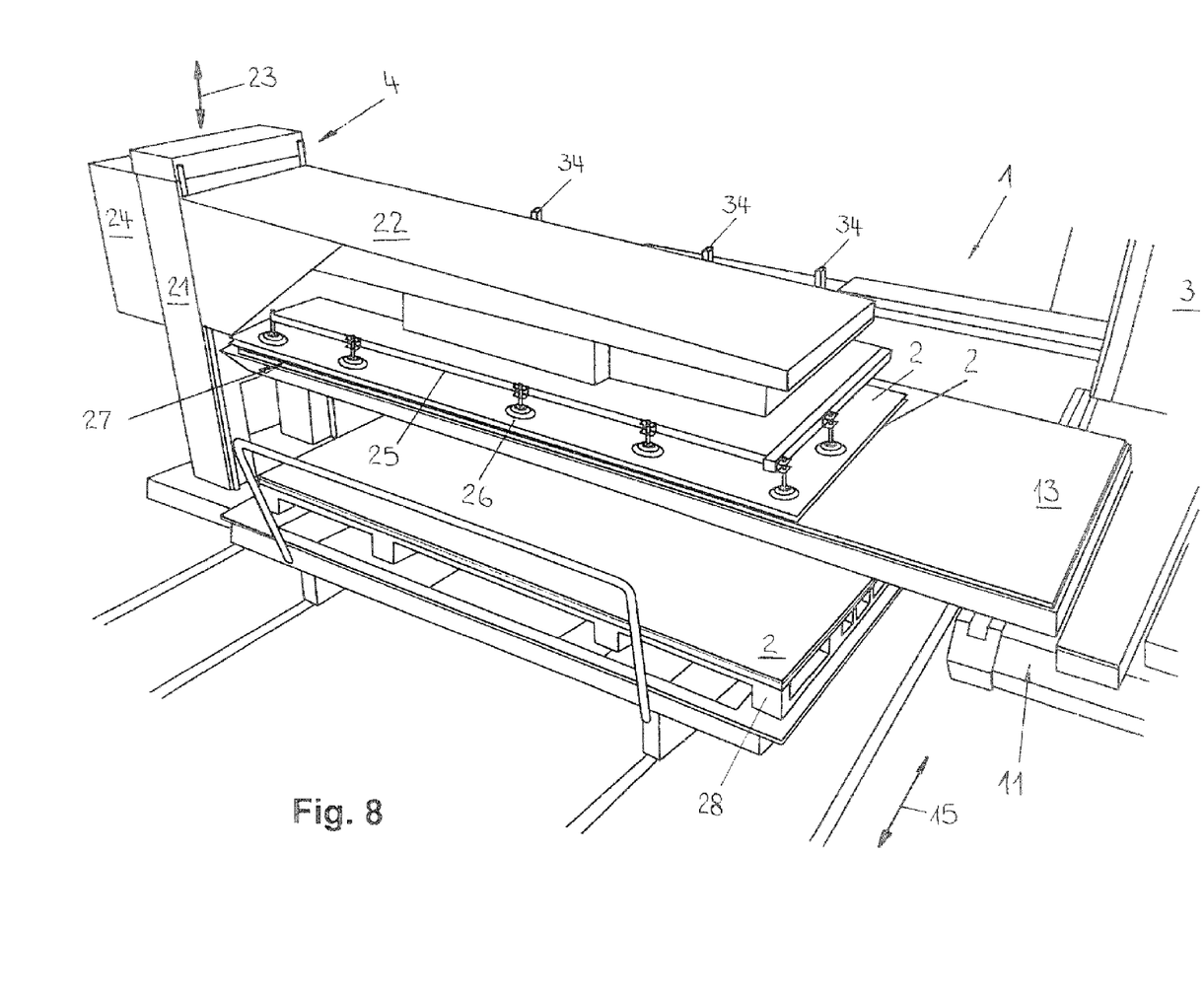

Starting therefrom, the workpiece holding member 27 with the metal sheet 2 fixed thereto is raised with a loading movement in the direction towards the upper end position. At the same time, the workpiece fixing devices 34 which are mounted on the cantilever arm 22 and which are further deactivated are thereby moved with a positioning movement in the movement direction 23 into the sweeping position. With the workpiece fixing devices 34 being deactivated as before, the workpiece support 11 now moves with the movable support portion 13 in the movement direction 15 from the rear into the front end position thereof. The (processed) metal sheet 2 on the workpiece support 11 consequently arrives below the (blank) metal sheet 2 which is held on the workpiece holding member 27 and which is still to be processed (FIG. 8).

Figure 9:
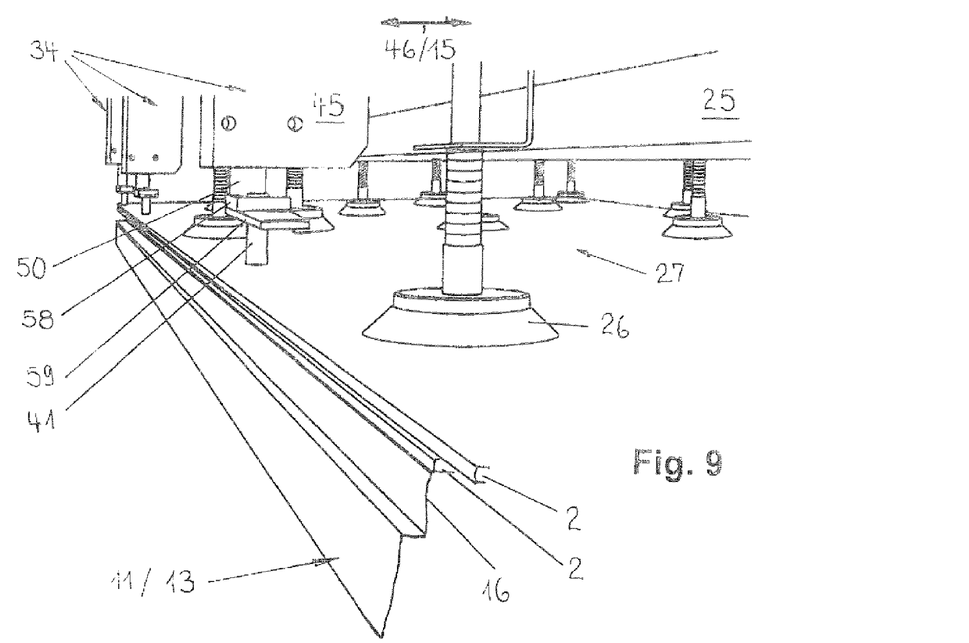

At the rear side of the cantilever arm 22, the fixing members 41 of the deactivated workpiece fixing devices 34 are located above the (blank) metal sheet 2 which is fixed to the workpiece holding member 27 and consequently also above the (processed) metal sheet 2 which rests on the workpiece support 11. As seen in FIG. 9, the arms 58 and the guiding plates 59 of the workpiece fixing devices 34 that are raised into the sweeping position extend substantially parallel with the rear longitudinal edges of the two mentioned metal sheets 2. The arms 58 and the guiding plates 59 and the fixing members 41 of the workpiece fixing devices 34 are located in the movement direction 15 or in the direction of the double-headed arrow 46 over the metal sheets 2.

Starting from these relationships, the first drive units 38 of the workpiece fixing devices 34 are actuated first (FIGS. 2, 3). Consequently, the second drive units 39 of the workpiece fixing devices 34 move in the direction towards the transverse rail 18 of the coordinate guide 17. The arms 58 and the guiding plates 59 of the workpiece fixing devices 34 remain in a state orientated parallel with the edges of the (blank) metal sheet 2 on the workpiece holding member 27 and the (processed) metal sheet 2 on the workpiece support 11 but are now offset with respect to the mentioned sheet metal edges in the direction towards the transverse rail 18.

Figure 10:
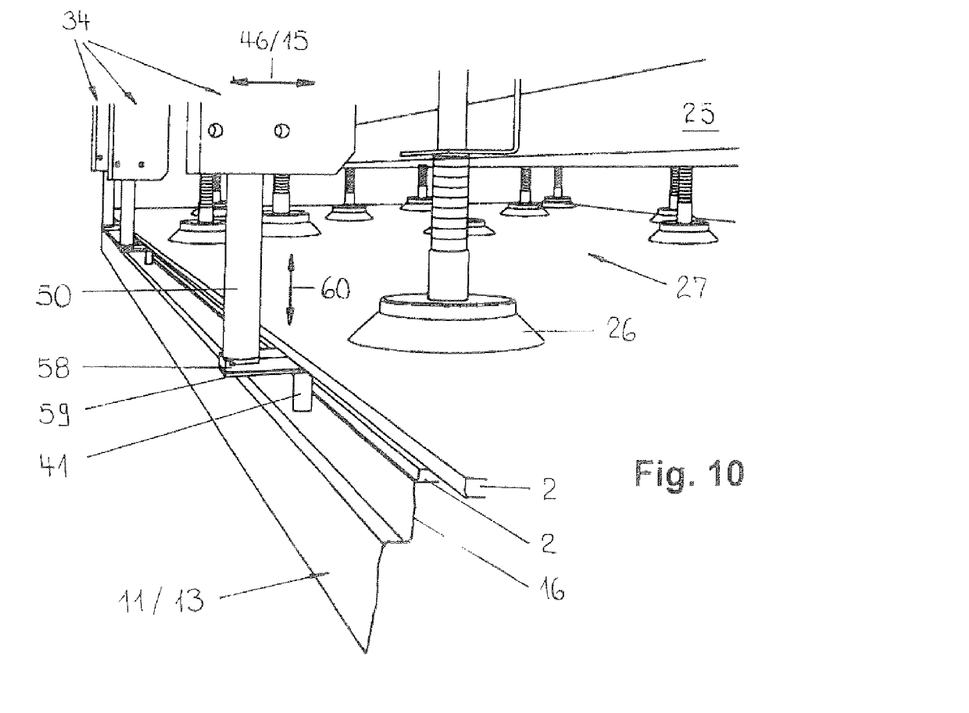

The second drive units 39 of the workpiece fixing devices 34 are now activated. Consequently, the guiding rods 50 with the fixing members 41 move downwards from their upper end position. Referring also to FIG. 3, as long as the guiding pin 52 on the guiding rods 50 moves in the linear end portion 55 of the guiding slot 53 on the guiding pipe 54, the guiding rod 50 and with it the arm 58, the guiding plate 59 and the fixing member 41 of each workpiece fixing device 34 carries out only a downwardly directed translation movement. If, during this translation movement the arm 58 of the workpiece fixing devices 34 has passed the (blank) metal sheet 2 held on the workpiece holding member 27, the guiding pin 52 of the guiding rods 50 reaches the transition portion 57 of the associated guiding slot 53 in each case. Consequently, the guiding rods 50 of the workpiece fixing devices 34 rotate about their longitudinal axis and thereby pivot the arms 58 with the fixing members 41 fitted thereto and the guiding plates 59 below the (blank) metal sheet 2 fixed to the workpiece holding member 27. The arms 58 and the guiding plates 59 of the workpiece fixing devices 34 reach the intermediate space between the lower side of the (blank) metal sheet 2 on the workpiece holding member 27 and the upper side of the (processed) metal sheet 2 placed on the workpiece support 11. The fixing members 41 of the workpiece fixing devices 34, at the end of their activation movement, are adjacent the rear longitudinal edge of the (processed) metal sheet 2 resting on the workpiece support 11 (FIG. 10).

Below the workpiece support 11, the completed part pallet 31 has moved from the rear end position into the front end position thereof, where it is located with the upper side thereof below the movable support portion 13 and extends over the blank metal sheet pallet 28 in the manner of a portal.

Figure 11:
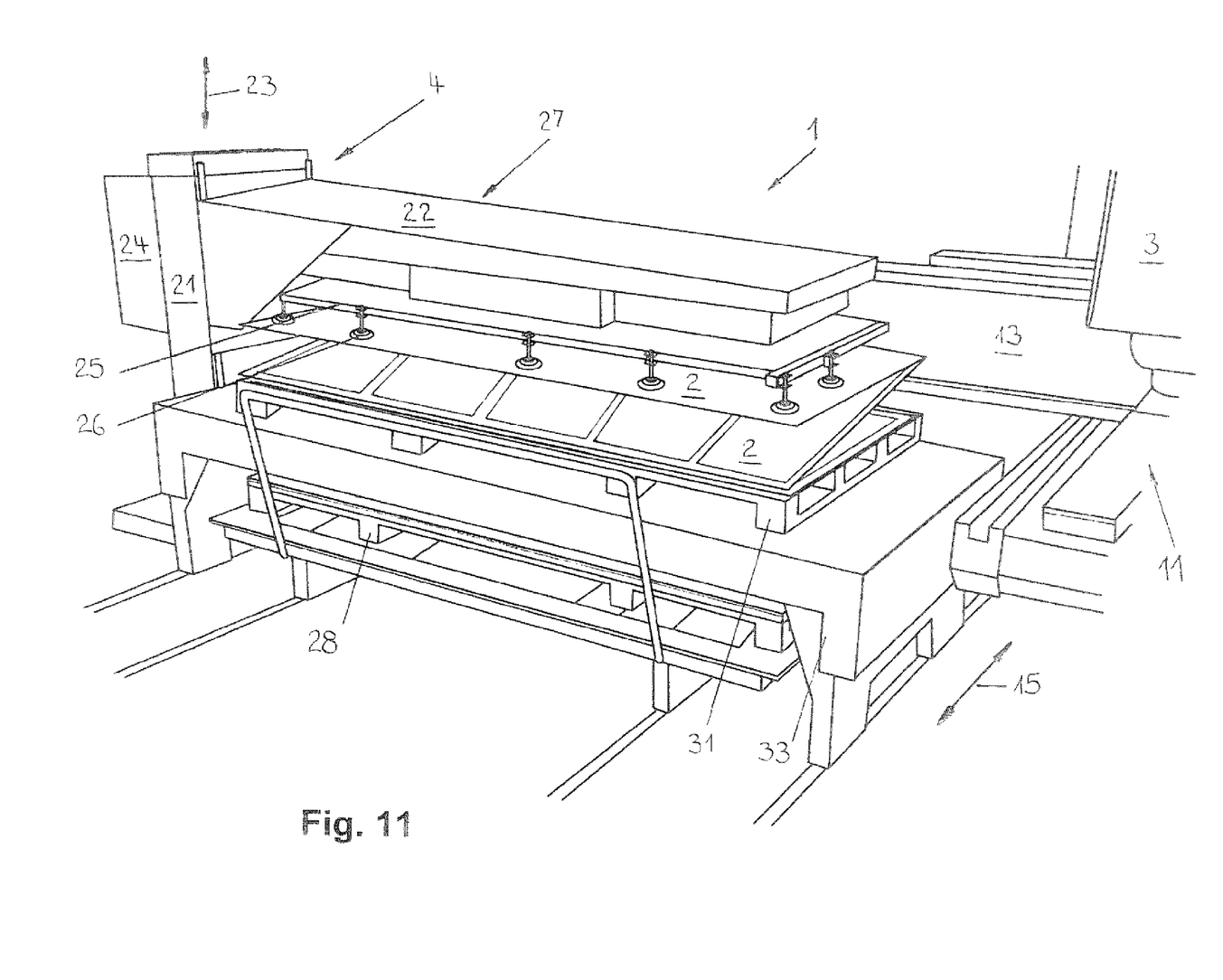

The workpiece support 11 with the movable support portion 13 is now moved in the movement direction 15 from the front end position into the rear end position. The (processed) metal sheet 2 on the movable support portion 13 abuts the fixing members 41 of the workpiece fixing devices 34 with the rear longitudinal edge thereof. The fixing members 41 bear against the (processed) metal sheet 2 and thereby prevent a common movement with the movable support portion 13, which is moving into the rear end position thereof. The movable support portion 13 is thereby pulled out from below the (processed) metal sheet 2. The (processed) metal sheet 2 is swept off from the workpiece support 11 and reaches the completed part pallet 31 which is located in the front end position thereof (FIG. 11).

When moving into the rear end position, the workpiece support 11 is passed by the fixing members 41 of the stationary workpiece fixing devices 34 protruding beyond the lower side of the (processed) metal sheet 2 in the movement direction 15. This is readily possible since the upper side of the workpiece support 11 is provided with support brushes 16 whose resilient bristles can deviate laterally with respect to the fixing members 41.

The guiding plates 59 act as a guide for the (processed) metal sheet 2, which has been swept from the workpiece support 11 when it is transferred onto the completed part pallet 31. In particular, the guiding plates 59 ensure that the workpiece swept from the workpiece support 11 does not pivot upwards with the rear longitudinal edge thereof in an uncontrolled manner and thereby damage the lower side of the (blank) metal sheet 2 held on the workpiece holding member 27 or the workpiece holding member 27 itself.

When the (processed) metal sheet 2 is swept from the workpiece support 11 and transferred to the completed part pallet 31, the workpiece fixing devices 34 are changed into the deactivated state and the workpiece support 11 moves with the movable support portion 13, which is now unloaded, from the rear end position into the front end position below the (blank) metal sheet 2 fixed to the workpiece holding member 27. In order to deactivate the workpiece fixing devices 34, the second drive units 39 of the workpiece fixing devices 34 are actuated first. The arms 58 and the guiding plates 59 of the workpiece fixing devices 34 are thereby orientated parallel with the rear longitudinal edge of the (blank) metal sheet 2 and lifted above the (blank) metal sheet 2. Subsequently, the second drive units 39 are pulled towards the cantilever arm 22 of the workpiece holding member 27 by the first drive units 38 being actuated. The deactivation movement of the fixing members 41 is thereby ended.

As soon as the workpiece support 11 has been moved with the movable support portion 13 below the (blank) metal sheet 2 on the workpiece holding member 27, the (blank) metal sheet 2 can be transferred to the workpiece support 11 and the coordinate guide 17 in order to carry out the punching workpiece processing operation.

A number of embodiments of the invention have been described. Nevertheless, it will be understood that various modifications may be made without departing from the spirit and scope of the invention. Accordingly, other embodiments are within the scope of the following claims.

What is claimed is:

1. A sheet metal workpiece processing apparatus comprising:
   a workpiece support on which a sheet metal workpiece is supported during a processing operation and that is movable in a horizontal movement direction;
   a processed metal sheet pallet configured to be arranged below the workpiece support and to be passed over by the workpiece support moving in the horizontal movement direction;
   a metal sheet loader with a workpiece holder provided with holding elements that are configured to releasably hold a blank metal sheet, the workpiece holder being movable in a driven manner relative to the workpiece support with a loading movement while the holding elements are holding the blank metal sheet, such that the loading movement supplies the held workpiece to the workpiece support; and
   an unloading device comprising a workpiece sweeper with a workpiece fixing device connected to the workpiece holder of the loader;
   wherein the workpiece fixing device of the unloading device is movable with a positioning movement into a sweeping position, the positioning movement being performed by a movement of the workpiece holder of the loader;
   wherein the workpiece fixing device of the unloading device has a fixing member in the form of a stop which, in the sweeping position of the workpiece fixing device of the unloading device, is movable in a vertical direction between a non-operational position and an operational position,
   wherein the workpiece support is movable in the horizontal movement direction relative to the workpiece fixing device of the unloading device, with the processed metal sheet pallet arranged below the workpiece support, while the workpiece fixing device of the unloading device is in the sweeping position; and
   wherein the stop of the workpiece fixing device of the unloading device is, in the operational position, positioned to abut an edge of the processed metal sheet supported on the workpiece support, such that subsequent movement of the workpiece support in the horizontal movement direction relative to the stop, in the operational position, of the workpiece fixing device of the unloading device sweeps the abutted processed metal sheet from the workpiece support with a sweeping movement, the processed metal sheet thus reaching the processed metal sheet pallet arranged below the workpiece support.

2. The workpiece processing apparatus of claim 1, wherein the workpiece fixing device of the unloading device is connected to the workpiece holder of the loader during at least a portion of the positioning movement by means of a mechanical connection.

3. The workpiece processing apparatus of claim 1, wherein the workpiece fixing device of the unloading device is fitted to a carrier structure of the workpiece holder of the loader.

4. The workpiece processing apparatus of claim 1, wherein the workpiece fixing device of the unloading device is configured to be lowered to a position below the workpiece support during a workpiece processing operation.

5. The workpiece processing apparatus of claim 1, wherein the workpiece holder of the loader is configured to be lowered to a position below the workpiece support during a workpiece processing operation.

6. The workpiece processing apparatus of claim 1, wherein the stop of the workpiece fixing device of the unloading device is selectively movable to its operational position with an at least partially linear activation movement from the non-operational position.

7. The workpiece processing apparatus of claim 1, wherein the stop of the workpiece fixing device of the unloading device is selectively movable to its non-operational position with an at least partially linear deactivation movement from the operational position.

8. The workpiece processing apparatus of claim 1, wherein the workpiece fixing device of the unloading device comprises a piston movable within a cylinder to move the stop of the workpiece fixing device of the unloading device between the operational position and the non-operational position.

9. The workpiece processing apparatus of claim 1, wherein the workpiece fixing device of the unloading device comprises a guide configured to guide the processed metal sheet while the processed metal sheet is swept from the workpiece support, the guide being positioned to extend over the edge of the processed metal sheet with the stop of the workpiece fixing device of the unloading device abutting the edge of the processed metal sheet.

10. A method of unloading a processed metal sheet from a workpiece support of a sheet metal workpiece processing apparatus on which workpiece support an unprocessed metal sheet was supported during a processing operation, the method comprising:

arranging a processed metal sheet pallet below the workpiece support;

moving a workpiece fixing device of an unloading device into a sweeping position;

activating the workpiece fixing device of the unloading device, with the workpiece fixing device arranged in the sweeping position, by moving a fixing member in the form of a stop of the workpiece fixing device of the unloading device in a vertical direction into an operational position to abut an edge of the processed metal sheet on the workpiece support; and performing a sweeping movement by moving the workpiece support in a horizontal movement direction relative to the stop of the workpiece fixing device of the unloading device whereby the processed metal sheet, whose edge is abutted by the stop, in the operational position, of the workpiece fixing device of the unloading device, is prevented from remaining on the workpiece support and is thereby unloaded onto the processed metal sheet pallet arranged below the workpiece support.

11. The method of claim 10, wherein the work-piece fixing device of the unloading device is mounted on a workpiece holder of a sheet metal loader.

12. The method of claim 10, wherein activating the workpiece fixing device of the unloading device comprises:

moving a guide of the workpiece fixing device of the unloading device to extend over the abutted edge of the processed metal sheet, to prevent elevation of the abutted edge during unloading.

13. The method of claim 10, wherein the stop of the workpiece fixing device of the unloading device is moved in to the operational position by both linear and rotational motion of a shaft of the workpiece fixing device of the unloading device.

14. The method of claim 10, further comprising:

positioning a blank metal sheet over the processed metal sheet resting on the workpiece support, with the blank metal sheet releasably held by a loading device.

* * * * *